US012760714B2

(12) United States Patent
Palmer et al.

(10) Patent No.: US 12,760,714 B2
(45) Date of Patent: Oct. 13, 2026

(54) LIGHTNING PROTECTION SYSTEM FOR A WIND TURBINE BLADE

(71) Applicant: LM WIND POWER A/S, Kolding (DK)

(72) Inventors: Andrew Palmer, Eastleigh (GB); Catherine Anne Mccarroll, Eastleigh (GB)

(73) Assignee: LM WIND POWER A/S, Kolding (DK)

( * ) Notice: Subject to any disclaimer, the term of this patent is extended or adjusted under 35 U.S.C. 154(b) by 212 days.

(21) Appl. No.: 18/715,114

(22) PCT Filed: Dec. 15, 2022

(86) PCT No.: PCT/EP2022/086162
§ 371 (c)(1),
(2) Date: May 30, 2024

(87) PCT Pub. No.: WO2023/111183
PCT Pub. Date: Jun. 22, 2023

(65) Prior Publication Data
US 2025/0198392 A1 Jun. 19, 2025

(30) Foreign Application Priority Data
Dec. 16, 2021 (EP) .................................... 21215228

(51) Int. Cl.
*F03D 80/00* (2016.01)
*F03D 80/30* (2016.01)
*H02G 13/00* (2006.01)

(52) U.S. Cl.
CPC ........... *F03D 80/301* (2023.08); *H02G 13/00* (2013.01)

(58) Field of Classification Search
CPC .... H05K 1/0306; H05K 1/115; H05K 3/4605; H05K 1/11; H05K 1/162;
(Continued)

(56) References Cited

U.S. PATENT DOCUMENTS

2014/0348654 A1 11/2014 Klein
2020/0025178 A1 1/2020 Christiansen et al.
(Continued)

FOREIGN PATENT DOCUMENTS

CN 109779829 A * 5/2019 ........... F03D 1/0675
EP 2930010 A1 10/2015
(Continued)

OTHER PUBLICATIONS

Examination Report dated Nov. 21, 2025 issued in corresponding European Application No. 22838787.4.

*Primary Examiner* — Pete T Lee
(74) *Attorney, Agent, or Firm* — Dority & Manning, P.A.

(57) ABSTRACT

The present invention relates to a wind turbine blade having a lightning protection system. The blade includes a pressure side shell part and a suction side shell part. The pressure side shell part or the suction side shell part comprises a blade component extending along a longitudinal axis of the blade and comprising one or more carbon fibre structures. The blade component is at least partially embedded in the shell part. An elongate metallic element is arranged in direct contact with the blade component, and at least part of the elongate metallic element is positioned between the blade component and an outer surface of the shell part. A lightning receptor is arranged in electrical contact with the elongate metallic element and extends to or near an outer surface of the blade shell part. The lightning receptor does not extend through the blade component.

18 Claims, 6 Drawing Sheets

SECTION A-A:

(58) Field of Classification Search
CPC . H05K 2201/09827; H05K 2201/0959; H05K 1/165; H05K 3/388; H05K 2201/09536; H05K 2201/10378; H05K 3/0026; H05K 3/421; H05K 3/46; H05K 3/4644; H05K 1/0271; H05K 1/16; H05K 2201/068; H05K 3/00; H05K 3/467; H05K 1/0216; H05K 1/092; H05K 2201/09454; H05K 2201/09481; H05K 2201/09527; H05K 2201/09618; H05K 3/002; H05K 3/067; H05K 3/429; H05K 2201/0154; H05K 2201/09509; H05K 3/426; H05K 3/4602; H05K 1/0298; H05K 1/181; H05K 2201/0175; H05K 2201/0179; H05K 2201/0344; H05K 2203/054; H05K 2203/107; H05K 3/0035; H05K 3/108; H05K 3/4038; H05K 3/4069; H05K 1/185; H05K 2201/0338; H05K 2201/09018; H05K 2201/09545; H05K 2201/096; H05K 2201/09745; H05K 2201/09845; H05K 2203/025; H05K 2203/0789; H05K 3/0052; H05K 3/18; H05K 1/116; H05K 2201/0355; H05K 2201/0394; H05K 2201/09036; H05K 2201/095; H05K 2201/09563; H05K 2203/05; H05K 2203/0568; H05K 2203/1194; H05K 2203/308; H05K 3/0011; H05K 3/0029; H05K 3/007; H05K 3/06; H05K 3/07; H05K 3/107; H05K 3/1258; H05K 3/188; H05K 3/26; H05K 3/40; H05K 3/4623; H05K 1/02; H05K 1/0231; H05K 1/0233; H05K 1/0266; H05K 1/0289; H05K 1/03; H05K 1/0313; H05K 1/09; H05K 1/18; H05K 2201/0347; H05K 2201/0358; H05K 2201/09581; H05K 2201/09609; H05K 2201/09645; H05K 2201/097; H05K 2201/09818; H05K 2201/09836; H05K 2201/10015; H05K 2201/1003; H05K 2201/1006; H05K 2201/10227; H05K 2201/10674; H05K 2203/0353; H05K 2203/0554; H05K 2203/0585; H05K 2203/0733; H05K 3/0017; H05K 3/0038; H05K 3/0041; H05K 3/0044; H05K 3/0047; H05K 3/061; H05K 3/064; H05K 3/382; H05K 3/389; H05K 3/403; H05K 3/423; H05K 3/427; H05K 3/428; H05K 3/4629; H05K 3/4652; H05K 3/4661; H05K 3/4685

See application file for complete search history.

(56) References Cited

U.S. PATENT DOCUMENTS

| | | | |
|---|---|---|---|
| 2021/0088025 | A1 | 3/2021 | Larsen et al. |
| 2021/0381494 | A1 | 12/2021 | Aubrion et al. |

FOREIGN PATENT DOCUMENTS

| | | | |
|---|---|---|---|
| EP | 2930010 | A8 | 12/2015 |
| WO | 2020/103990 | A1 | 5/2020 |

* cited by examiner

SECTION A-A:

SECTION B-B:

SECTION C-C:

SECTION D-D:

SECTION E-E:

LIGHTNING PROTECTION SYSTEM FOR A WIND TURBINE BLADE

This is a National Phase Application filed under 35 U.S.C. 371 as a national stage of PCT/EP2022/086162, filed Dec. 15, 2022, an application claiming the benefit of European Application No. 21215228.4, filed Dec. 16, 2021, the content of each of which is hereby incorporated by reference in its entirety.

FIELD OF THE INVENTION

The present invention relates to lightning protection systems for wind turbine blades.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Wind turbine blades are usually manufactured by forming two shell parts or shell halves from layers or plies of woven fabric or fibre and resin.

It is increasingly desirable that wind turbines are placed in remote areas to impact the environment less and because the wind conditions may be more advantageous. However, the remoteness makes the logistics more expensive. Furthermore, it is always desirable that blades are as resistant to lightning strikes as possible. Blades comprise carbon fibre composites as structural elements, in part because of its relatively light weight and its relatively high strength.

At the same time, carbon fibre composites have a certain conductivity, which allows lightning strike current to travel in the carbon fibre composites, but not without causing significant damage. It is therefore desirable to mitigate this.

It is an object of the present invention to provide a solution that mitigates these problems.

SUMMARY OF THE INVENTION

In a first aspect, the invention provides a wind turbine blade comprising a first blade shell part and a second blade shell part. The blade is characterised in that the first blade shell part comprises:

- a first blade component extending along a longitudinal axis of the blade and comprising one or more first carbon fibre structures, the first blade component being at least partially embedded in the first blade shell part,
- a first elongate metallic element arranged in direct contact with the first blade component, at least part of the first elongate metallic element being positioned between the first blade component and an outer surface of the first blade shell part, and
- a first lightning receptor arranged in electrical contact with the first elongate metallic element and extending to or near an outer surface of the first blade shell part, wherein the first lightning receptor does not extend through the first blade component.

In some embodiments, the second blade shell part comprises:

- a second blade component extending along the longitudinal axis of the blade and comprising one or more second carbon fibre structures, the second blade component being at least partially embedded in the second blade shell part,

- a second elongate metallic element arranged in direct contact with the second blade component, at least part of the second elongate metallic element being positioned between the second blade component and an outer surface of the second blade shell part, and
- a second lightning receptor arranged in electrical contact with the second elongate metallic element and extending to or near an outer surface of the second blade shell part, wherein the second lightning receptor does not extend through the second blade component.

The invention alleviates damage to blade components comprising carbon fibre by providing a conductive element, in particular a metallic element, that ensures that current is not conducted in blade components comprising carbon fibre. The invention is particularly directed to avoiding damage to such blade components situated relatively close to lightning receptors. In some embodiments, the first blade shell part is a pressure side shell half and the second blade shell part is a suction side shell half that together form the shell of the blade.

As recited above, the first and/or second blade component is at least partially embedded in the corresponding shell part. In some embodiments, the first blade component is embedded along its entire length in the first blade shell part, i.e. the first blade component is surrounded by blade material along its entire length. In other embodiments, the first blade component is only partially embedded, i.e. there are one or more sections of the first blade component that are not surrounded by blade material, which in turn means that those one or more sections are exposed (typically on an inner surface of the shell part). Embedding the first blade component, which may for instance be a premanufactured spar cap, increases the strength and robustness of the resulting first blade shell part compared to having a spar cap that is not entirely surrounded by other blade material along the entire length of the spar cap. Similarly, in some embodiments, a second blade component may be embedded along its entire length in the second blade shell part, i.e. the second blade component is surrounded by blade material along its entire length. In other embodiments, the second blade component is only partially embedded, i.e. there are one or more sections of the second blade component that are not surrounded by blade material, which in turn means that those one or more sections are exposed (typically on an inner surface of the shell part). Embedding the second blade component, which may for instance be a premanufactured spar cap, increases the strength and robustness of the resulting second blade shell part compared to having a spar cap that is not entirely surrounded by other blade material along the entire length of the spar cap.

In some embodiments, the first metallic element is in direct contact with carbon fibre material in the first blade component. This further reduces the risk that a lightning strike causes damage to the carbon fibre structures in the first blade component. In some embodiments, the second metallic element is in direct contact with carbon fibre material in the second blade component.

In some embodiments, the first lightning receptor extends at least from the first elongate metallic element to or near an outer surface of the first blade shell part. Preferably, the electrical connection between the first blade component and the outer surface of the first blade shell part is substantially the shortest possible. That is, the first lightning receptor is located over the first elongate metallic element seen along a normal to the outer surface at the position of the first lightning receptor (in other words, looking straight down on the first lightning receptor from the outer surface side of the first blade shell part). This reduces the risk of flashover inside the first blade shell part during a lightning strike to the first lightning receptor. Furthermore, the first lightning receptor can be inserted into the first blade shell part from the outside directly to or into the first elongate metallic element more easily. This results in a strong mechanical and electrical connection between the first lightning receptor and the first blade component. In accordance with the invention, the first lightning receptor does not extend through the first blade component, which is important since the first blade component contains carbon fibre material that must not be compromised. The same considerations apply to the second lightning receptor, if present in the second blade shell part.

In some embodiments, the first elongate metallic element is at least partially embedded in the first blade shell part together with the first blade component. This reduces the risk that the first elongate metallic element, rather than the first lightning receptor, attracts lightning, which is likely to lead to flashover that in turn can cause severe damage to the first blade shell part. Furthermore, embedding the first elongate metallic element results in a stronger and more robust first blade shell part. It also ensures a strong electrical connection between the first elongate metallic component and the first blade component. This further reduces the risk of flashover. The same applies to the second elongate metallic element, if present in the second blade shell part.

In some known solutions, metal conductors are present to conduct lightning current but not in any way embedded, which can cause such metal conductors to become loose and even dislodge and possibly also cause other elements to become loose and even dislodge.

In some embodiments, a length of the first elongate metallic element is at least 50% of a longitudinal length Z of the blade, such as at least 60% of the length of the blade, such as at least 75% of the length of the blade.

In some embodiments, a ratio between a length of the first elongate metallic element and a length of the first blade component is in the range 0.8 to 1.2, such as in the range 0.9 to 1.1, such as substantially equal to 1. In some embodiments, a ratio between a length of the second elongate metallic element and a length of the second blade component is in the range 0.8 to 1.2, such as in the range 0.9 to 1.1, such as substantially equal to 1. In other words, the length of the elongate metallic element is approximately as long, such as having the same length, as the blade component. This provides protection of the corresponding length of the blade component without using more metal for the elongate metallic element unless necessary for some reason. Also, if an elongate metallic element shorter than the blade component is sufficient, the elongate metallic element can accordingly be shorter than the blade component.

In some embodiments, the first blade component and the first elongate metallic element are in contact with one another substantially along an entire length of the first blade component or an entire length of the first elongate metallic element, whichever is shorter. This configuration minimizes the risk that current propagates in the carbon component.

In some embodiments, the blade further comprises a first electrical connector electrically connecting the first elongate metallic element and the second elongate metallic element to one another. This may provide a parallel connection between the first lightning receptor and a downconductor arranged in the hub for connecting the first and second elongate metallic element to ground. In some embodiments, the first electrical connector is configured at distal ends of the first elongate metallic element and the second elongate metallic element (the distal ends being the shell ends farthest from a root end of the blade). An advantage of this configuration is that the first and second metallic elements are closer to one another because blades normally taper in thickness in the direction towards the tip end, opposite the root end, meaning that the first electrical connector can be shorter compared to a position closer to the root end of the blade.

In some embodiments, the first and second elongate metallic elements extend to the tip of the corresponding blade shell part and are directly connected to one another at the tip.

In some embodiments, the first blade shell part and/or the second blade shell part comprises a plurality of lightning receptors in addition to the first lightning receptor. In some embodiments, the considerations above concerning the first lightning receptor are applied with respect to some or all of the plurality of lightning receptors in addition to the first lightning receptor.

In some embodiments, the first blade component and/or the second blade component is a spar cap comprising carbon fibre material. Spar caps are often included along a large portion of modern blades and are very susceptible to the issues described above. In some embodiments, the first blade component and/or the second blade component is a spar cap formed by pultrusion.

In some embodiments, the blade further comprises a downconductor arranged between the first blade shell part and the second blade shell part, the downconductor being electrically connected to the first elongate metallic element and/or the second elongate metallic element. The downconductor, when the blade is installed on a wind turbine hub, is furthermore electrically connected to ground so lightning current from the elongate metallic element(s) is conducted to ground.

In some embodiments, the one or more first carbon fibre structures and/or the one or more second carbon fibre structures comprise carbon fibre mats or carbon fibre reinforced composite planks. Separate planks making up a spar cap may be even more susceptible to flashovers. Protecting a spar cap made of planks is therefore critical.

In some embodiments, the first metallic conductor and/or the second metallic conductor is made of copper or a copper alloy, aluminium or aluminium alloy, or other metal or metal alloy with high conductivity.

In some embodiments, the first metallic conductor and/or the second metallic conductor has a cross-sectional area of at least 50 $mm^2$, such as in the range 50-100 $mm^2$, such as in the range 60-90 $mm^2$, such as in the range 70-80 $mm^2$. These cross-sectional dimensions ensure that there is little heating during a lightning strike while keeping the weight down.

In some embodiments, the first elongate metallic element is a metal strip, such as a copper metal strip. In some embodiments, the metal strip has a rectangular cross-section along the longitudinal axis of the blade, a height of said part of the first elongate metallic element being in the range 1-5 mm, such as in the range 2-4 mm, such as being a height of 3 mm, and a width of said part of the first elongate metallic element is in the range 5-30 mm, such as in the range 10-30 mm, such as in the range 20-30 mm, such as a width of 25 mm. A trapezoidal cross-section may in some cases be advantageous. In some embodiments, the metallic first and/or second metallic element have one or more rounded corners.

In some embodiments, a length of the downconductor is at most 0.5 times a length of the blade, such as at most 0.3 times the length of the blade, such as at most 0.2 times the length of the blade, such as at most 0.02 times the length of the blade. In some embodiments, the downconductor only extends from the root end to a position at which the first and/or second metallic element begins. The metallic elements act as downconductors themselves, thus being able to replace a conventional downconductor inside the blade. Such downconductors are associated with various mechanical issues, including the need to attach the downconductor to shear webs or the like, and there is a need to couple individual lightning receptors to such a downconductor. The metallic elements of the present invention in contact with blade components and lightning receptors mitigate these issues.

A second aspect of the invention provides a premanufactured elongate fibre-reinforced composite element for being incorporated into a wind turbine blade shell. The premanufactured elongate fibre-reinforced composite element comprises:

- a blade component extending along a longitudinal axis of the premanufactured composite element, the blade component comprising one or more carbon fibre structures, and
- an elongate metallic element arranged in direct contact with the blade component.

Such a premanufactured elongate fibre-reinforced composite element can ease the implementation of the first aspect since the premanufactured elongate fibre-reinforced composite element can be made independently of laying up other wind turbine blade materials in a blade mould. The premanufactured element is then added as part of laying up the wind turbine blade materials. This avoids complications arising from having to lay up the metallic element and the blade component correctly as separate parts in the blade mould. This reduces the manufacturing time of wind turbine blades that implement the first aspect of the invention.

In some embodiments, the blade component is a spar cap for a wind turbine blade shell and the elongate metallic element is a metal strip extending substantially along an entire length of the spar cap.

The features discussed in relation to the first aspect apply equally to the second aspect. For instance, a ratio between a length of the elongate metallic element and a length of the blade component is, in some embodiments, in the range 0.8 to 1.2, such as in the range 0.9 to 1.1, such as substantially equal to 1. In other words, the length of the elongate metallic element is on the same order as the blade component. This provides protection of the corresponding length of the blade component using only as much metal for the elongate metallic element as is necessary. Also, if an elongate metallic element shorter than the blade component is sufficient, the elongate metallic element can accordingly be shorter than the blade component.

Similarly, in some embodiments, the metallic conductor has a cross-sectional area of at least 50 $mm^2$, such as in the range 50-100 $mm^2$, such as in the range 60-90 $mm^2$, such as in the range 70-80 $mm^2$.

BRIEF DESCRIPTION OF THE DRAWINGS

The invention is explained in detail below with reference to embodiments shown in the drawings.

DETAILED DESCRIPTION OF SELECTED EMBODIMENTS

Figure 1:
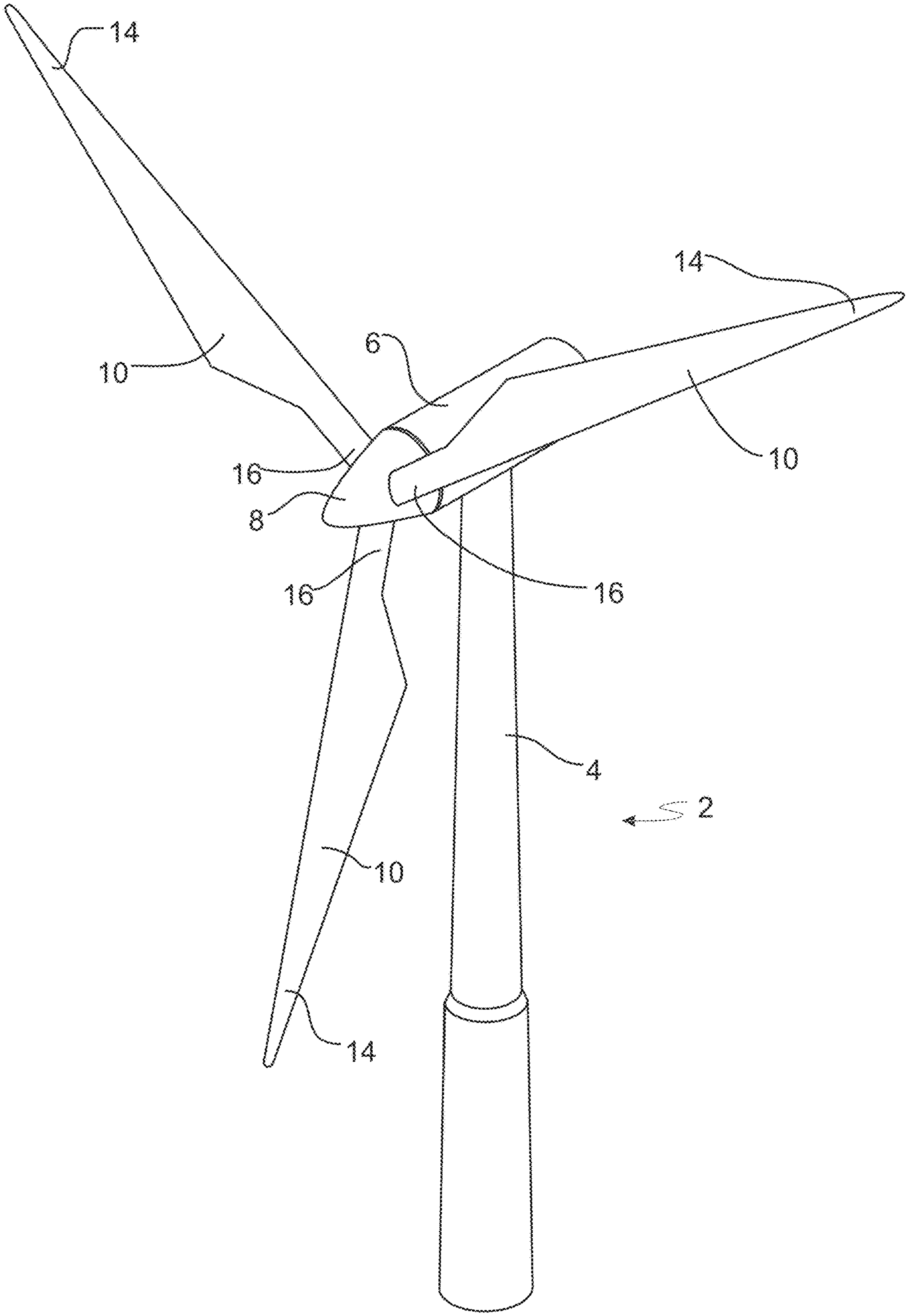
FIG. 1 is a schematic view of a wind turbine.

In the following, selected embodiments of the invention are described with reference to the attached drawings. The examples shall not to be construed as limiting the scope of protection as defined by the claims. The dimensions in the drawings are for exemplification only and shall not be construed as limiting, unless otherwise indicated.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
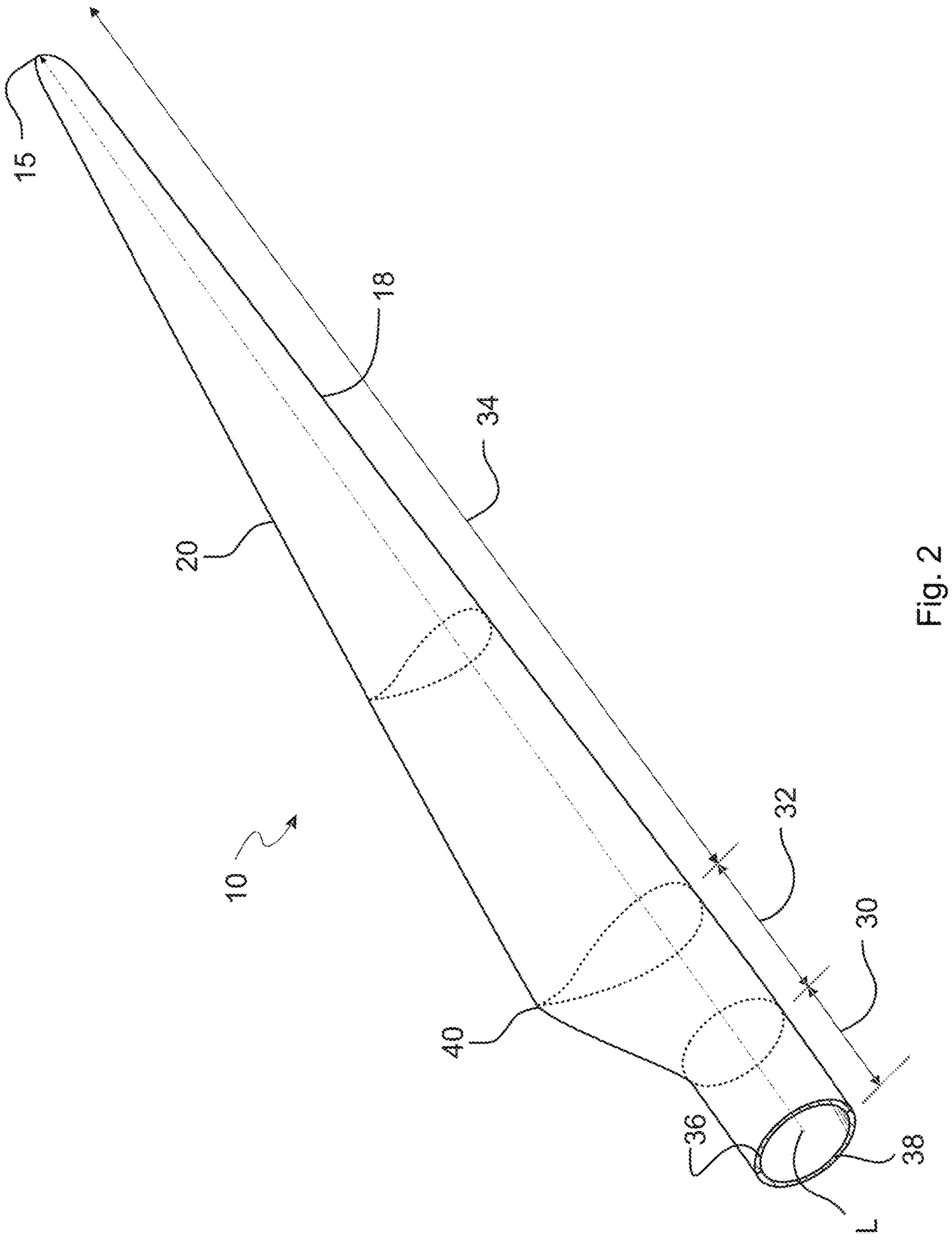
FIG. 2 is a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15. The blade 10 comprises a pressure side shell part 36 and a suction side shell part 38. Together, they form the shell of the wind turbine blade 10.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position where the blade 10 has its largest chord length. The shoulder 40 is typically provided at the boundary between the transition region 32 and the airfoil region 34. FIG. 2 also illustrates the longitudinal length Z of the blade.

Figure 3:
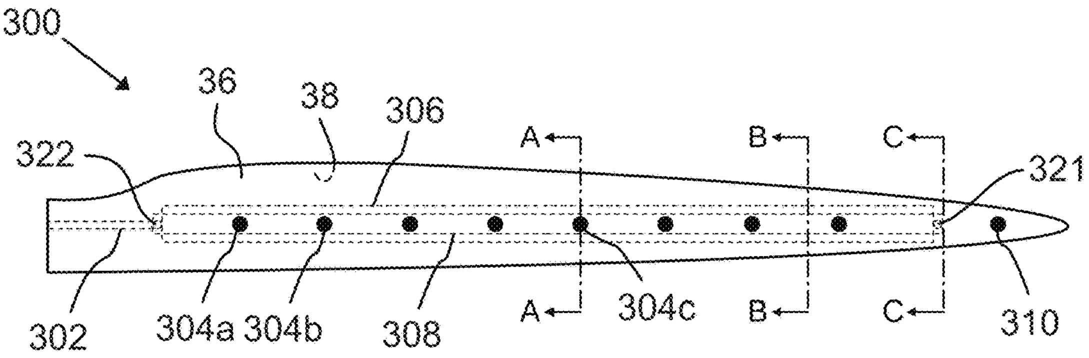
FIG. 3 illustrates a wind turbine blade in accordance with an embodiment of the invention.

FIG. 3 illustrates an embodiment of a blade 300 in accordance with the first aspect of the invention. The blade is shown from a pressure side shell part 36 of the blade 300. A first wind turbine blade component 306, such as a carbon fibre spar cap, is at least partially embedded in the pressure side shell part 36, positioned below an outer surface of the pressure side shell part 36. A conductive element 308, such as a metal strip, such as a copper strip, is in direct contact with the carbon fibre spar cap component 306 along the length of the carbon spar cap 306. The copper strip 308 is also located below the outer surface of the pressure side shell part 36. The copper strip 308 is arranged between the spar cap 306 and the outer surface of the pressure side shell part 36. That is, the copper strip 308 is closer to the outer surface of the pressure side shell part 36 than the spar cap 306. The pressure side shell part 36 of the blade 300 further comprises a number of one or more lightning receptors, including receptors 304*a*, 304*b*, 304*c*, and 310. The lightning receptors 304*a*, 304*b*, and 304*c* are in contact with the copper strip 308 and extend from the copper strip 308 to or near the outer surface of the pressure side shell part 36 to provide lightning attraction. The lightning receptor 310 near the tip of the blade is not in direct contact with the copper strip 308. In other embodiments, all lightning receptors are in direct contact with the copper strip 308. In the present example, the receptor 310 must be coupled to ground another way, such as by a separate conductor 302 coupled to the copper strip 308.

FIG. 3 further illustrates a connector element 321 that connects the copper strip 308 in the pressure side shell part 36 to a corresponding copper strip (not shown in FIG. 3) in the suction side shell part 38. The example also includes a second connector element 322 that connects the copper strip 308 with the copper strip in the suction side shell part 38. This is illustrated below.

Figure 4A:
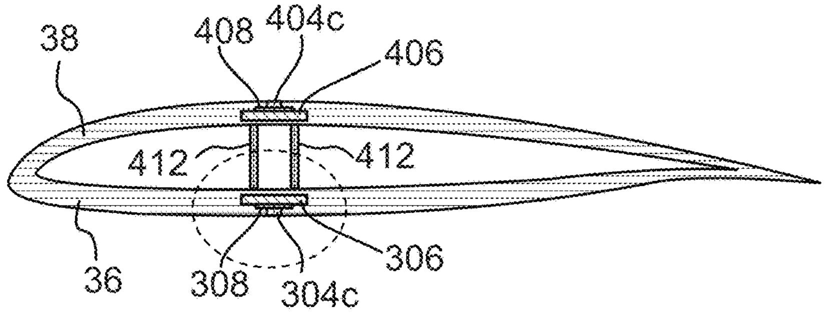
FIG. 4A illustrates a cross-section of a wind turbine blade in accordance with an embodiment of the invention.

FIG. 4A illustrates a cross-sectional view A-A as indicated in FIG. 3. The cross-section is through receptor 304*c*, as seen in FIG. 3 and FIG. 4A. The carbon fibre spar cap 306 is embedded in the pressure side shell part 36. A copper strip 308 is positioned in direct contact with the carbon spar cap 306. The lightning receptor 304*c* extends between the surface of the pressure side shell part 36 and the copper strip 308. The lightning receptor does not extend into the carbon spar cap 306, as this would compromise the integrity of the carbon spar cap 306. Thus, the lightning receptor extends only through non-carbon material, such a glass fibre material. The copper strip aids in distributing the current received at the relatively small receptor 304*c* across a relatively large area of the carbon spar cap 306. This prevents high local currents in the carbon spar cap that may cause severe damage to the carbon spar cap due to its relatively poor conductivity.

Figure 4B:
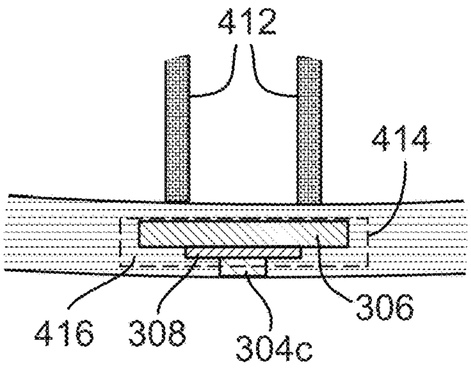
FIGS. 4B and 4C illustrate a detail of a cross-section of a wind turbine blade in accordance with an embodiment of the invention.

FIG. 4B illustrates the area encircled in FIG. 4A in more detail, showing more clearly the copper strip 308 in contact with the carbon spar cap 306, and the receptor 304*c* in contact with copper strip 308.

Figure 4C:
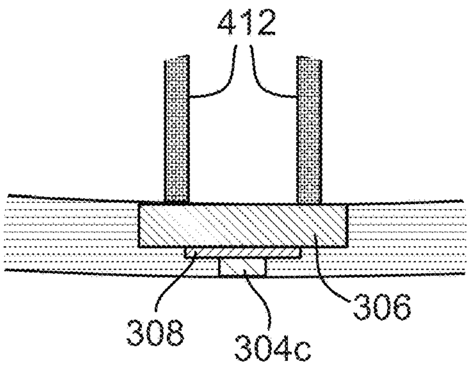
Figure 4D:
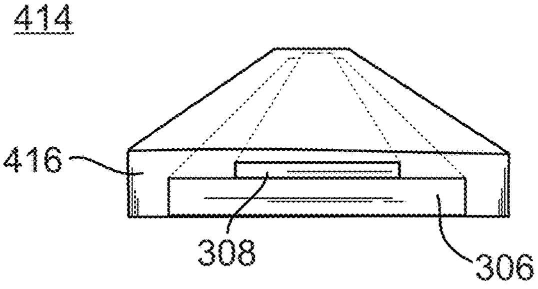
FIG. 4D illustrates a premanufactured elongate fibre-reinforced composite element in accordance with an embodiment of the invention.

The region 414 indicated with a dashed line in FIG. 4B can advantageously be provided as a premanufactured composite element as shown in FIG. 4D. During manufacturing of the pressure side shell part 36, the premanufactured composite element is laid up in the shell part mould where needed, and other elements of the shell part are added, before and/or after. Lightning receptors such as lightning receptor 304*c* can be added during manufacturing of the blade shell part or after. Appropriate coupling means are included, as required. The premanufactured composite element may combine the carbon spar cap 306 with glass fibre material 416 to produce a robust element that is relatively easy to handle and arrange in the shell part mould together with other fibre material before resin infusion.

FIG. 4C illustrates an alternative embodiment compared to the cross-section illustrated in FIGS. 4A and 4B. Instead of being entirely embedded in the pressure side shell part 36 at cross-section A-A, the spar cap 306 forms an inner surface of the pressure side shell part 36, at least in the vicinity of the cross-section A-A.

Similarly, the suction side shell part 38 may include a carbon fibre spar cap 406, and a copper strip 408 may be positioned in direct contact with the carbon spar cap 406. The lightning receptor 404*c* extends between the surface of the suction side shell part 38 and the copper strip 408. As described above in relation to lightning receptor 304*c*, the lightning receptor 404*c* does not extend into the carbon spar cap 406, as this would compromise the integrity of the carbon spar cap 406. Thus, the lightning receptor extends only through non-carbon material, such as a glass fibre material. The copper strip 408 aids in distributing the current received at the receptor 404*c* across a relatively large area of the carbon spar cap 406, preventing high local currents in the carbon spar cap that may cause severe damage to the carbon spar cap due to its relatively poor conductivity.

Figure 5A:
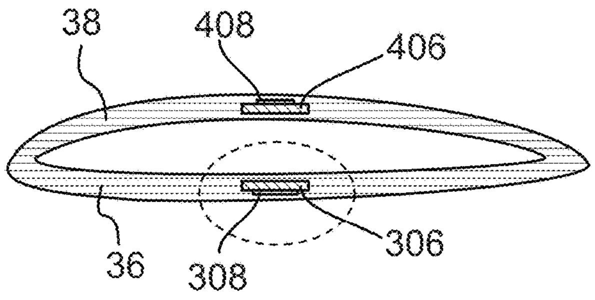
FIG. 5A illustrates a cross-section of a wind turbine blade in accordance with an embodiment of the invention.

FIG. 5A illustrates a cross-sectional view B-B as indicated in FIG. 3. The cross-section is closer to the tip of the blade 300, and it does not intercept a lightning receptor. Thus, the pressure side shell part comprises only the carbon spar caps 306 and 406 and associated copper strips 308 and 408. This is illustrated in more detail in FIG. 5B. For simplicity, a shear web is not illustrated.

Figure 6A:
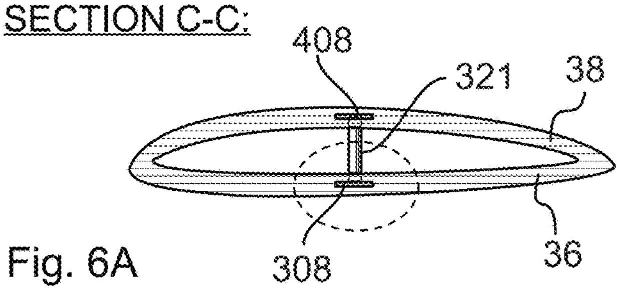
FIG. 6A illustrates a cross-section of a wind turbine blade in accordance with an embodiment of the invention.
Figure 6B:
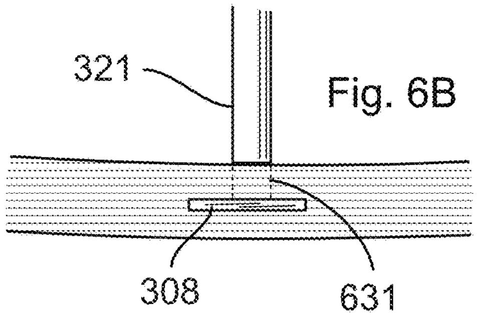
FIG. 6B illustrates a detail of a cross-section of a wind turbine blade in accordance with an embodiment of the invention.

FIG. 6A illustrates a cross-sectional view C-C as indicated in FIG. 3. This cross-section is yet closer to the tip of the blade 300 compared to cross-section B-B, and like cross-section B-B, it does not intercept a lightning receptor. Instead, the cross-section coincides with the end of the copper strip 308 in the pressure side shell part 36. A connector element 321 connects the copper strip 308 in the pressure side shell part to the copper strip 408 in the suction side shell part. In this example, as illustrated in FIG. 6B, the conductive element extends into the shell part 36 in order to connect to the copper strip 308. As will be described below, this connection reduces the heating generated in the blade from a lightning strike.

Figure 5B:
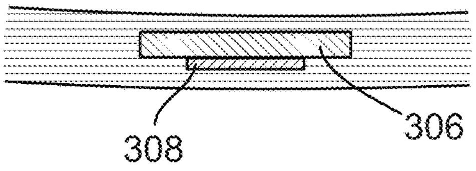
FIG. 5B illustrates a detail of a cross-section of a wind turbine blade in accordance with an embodiment of the invention.
Figure 7A:
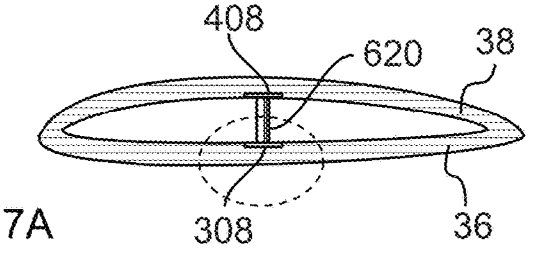
FIG. 7A illustrates a cross-section of a wind turbine blade in accordance with an embodiment of the invention.
Figure 7B:
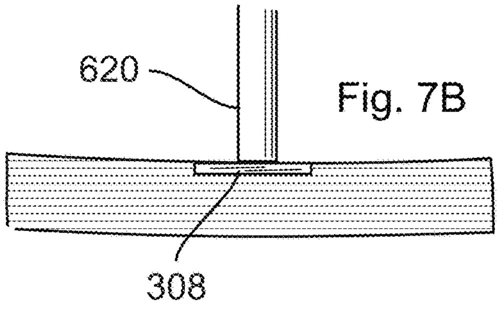
FIG. 7B illustrates a detail of a cross-section of a wind turbine blade in accordance with an embodiment of the invention.

FIG. 7A illustrates an alternative embodiment compared to the cross-section illustrated in FIG. 6A. Instead of being embedded in the pressure side shell part 36 at cross-section C-C, the copper strip 308 has instead been adapted to form part of an inner surface of the pressure side shell part 36, at least in the vicinity of the cross-section C-C. The copper strip at cross-section B-B may still look as shown in FIGS. 5A and 5B, but transitions towards the inner surface of the shell parts 36 and 38 towards the cross-section C-C. This can be achieved during layup in a blade mould or during premanufacturing of a portion similar to portion 414 shown in FIG. 4D.

Figure 8:
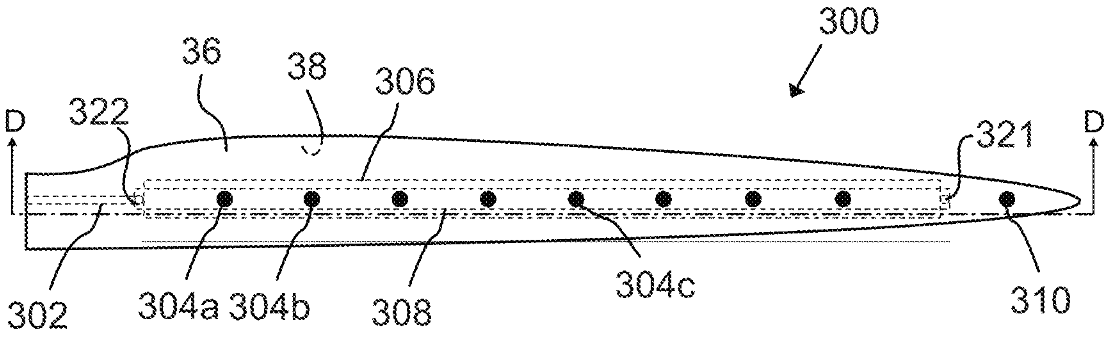
FIG. 8 illustrates a wind turbine blade in accordance with an embodiment of the invention.

FIG. 8 indicates another cross-section, D-D, in the blade 300. The cross-section intersects the carbon spar caps 306 and 406, but not the copper strips 308 and 408 and the lightning receptors.

Figure 9:
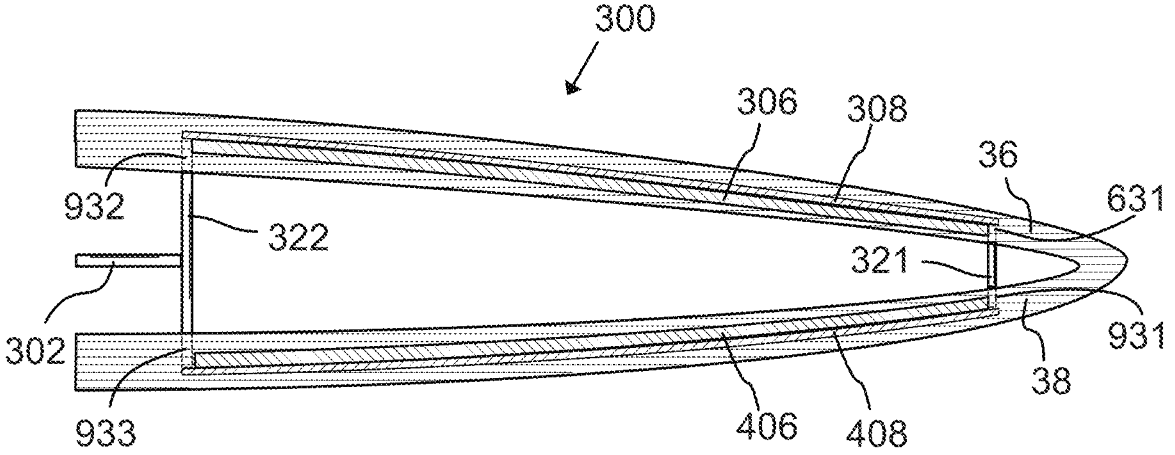
FIG. 9 illustrates a cross-section of a wind turbine blade in accordance with an embodiment of the invention.

FIG. 9 illustrates cross-section D-D defined in FIG. 8. It shows the copper strips 308 and 408 arranged in contact with the carbon spar caps 306 and 406 along a longitudinal axis of the blade.

The example in FIG. 9 illustrates an example of grounding of the copper strips. In this example, conductive element 321, mentioned earlier, connects the copper strips 308 and 408 electrically to one another near a tip end of the blade 300, and similarly, conductive element 322, also mentioned earlier, connects the copper strips 308 and 408 electrically to one another near a root end of the blade 300. Contact elements 631 and 931 connect the conductive element 321 to the copper strips which, in this example, are embedded in the shell parts and therefore not readily accessible. A contact element 631 for the copper strip 308 may for instance be provided by drilling a hole from an inside surface of the blade shell to the copper strip 308 and inserting a conductive element into the hole in electrical contact with the corresponding copper strip 308. The contact element 631 may for instance be a cylindrical metal piece that fits the hole, such as a copper piece. In view of this disclosure, the person skilled in the art can easily envision various other ways of providing the connection between the copper strips 308 and 408 at the tip end. The same applies to connection via conductive element 322, where contact elements 932 and 933 provide electrical connection between the copper strips 308 and 408 and the conductive element 322.

Finally, the example in FIG. 9 illustrates the actual grounding, which in this example is by electrical connection to a downconductor 302 arranged only near the root end of the blade 300. It is seen that the copper strips 308 and 408 can replace a downconductor arranged inside the shell made up of the pressure side shell part and the suction side shell part, between the pressure and suction side shell parts 36 and 38. Such a downconductor involves a number of mechanical issues associated with attachment of the downconductor to shear webs or the like, as well as the need to couple individual lightning receptors, such as receptors 304*a*, 304*b*, and 304*c*, to the downconductor running inside the shell along most of the length of the blade.

The connection 321 at the tip has the advantage that a parallel circuit is achieved, which reduces the resistance between any one lightning conductor and ground by providing two current paths from the lightning receptor to ground rather than just one, as would be the case in the absence of the connection provided by conductive element 321.

The downconductor 302 is typically connected to ground through the hub. Connection of a downconductor to ground is well known in the art and will therefore not be addressed in further detail.

Figure 10:
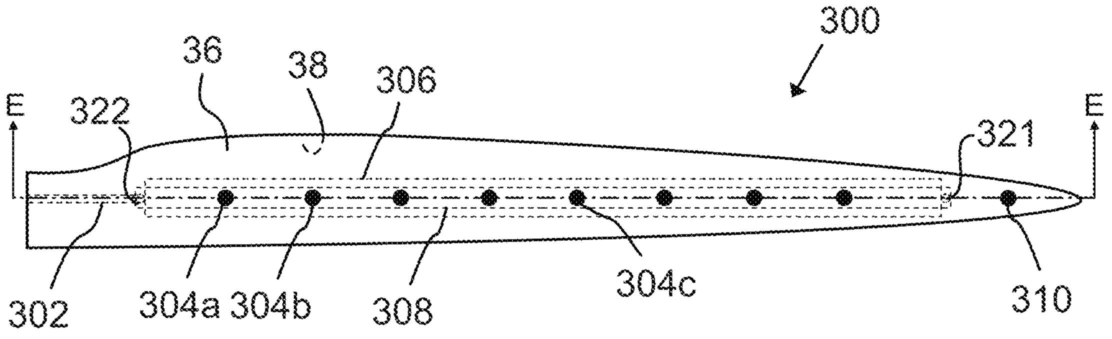
FIG. 10 illustrates a wind turbine blade in accordance with an embodiment of the invention.

FIG. 10 indicates another cross-section, E-E, in the blade 300. The cross-section E-E intersects the carbon spar caps 306 and 406, the copper strips 308 and 408, and the lightning receptors.

Figure 11:
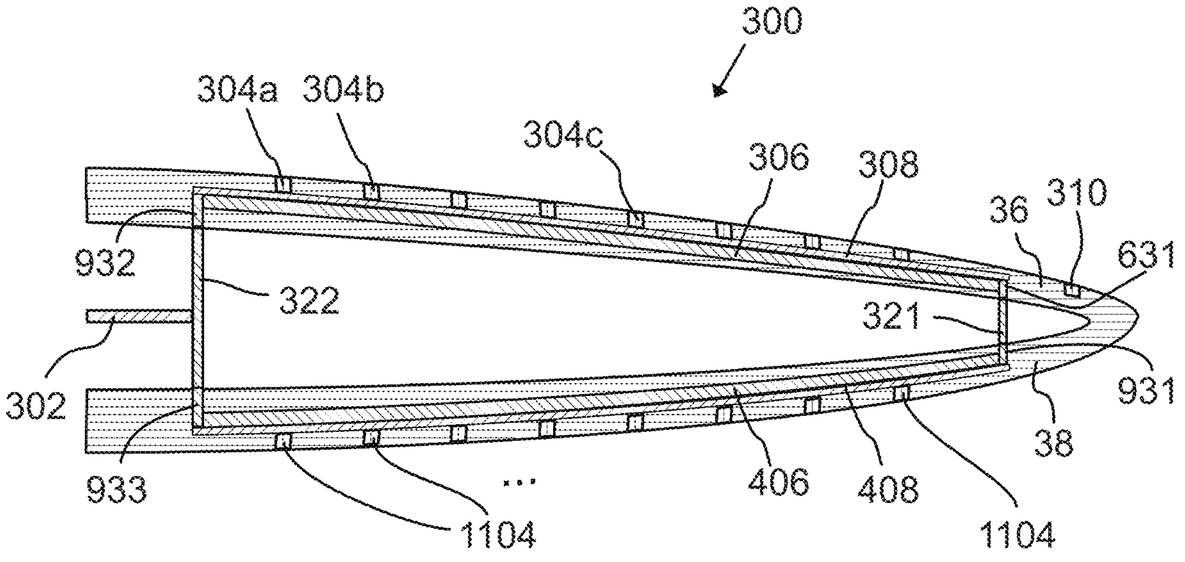
FIG. 11 illustrates a cross-section of a wind turbine blade in accordance with an embodiment of the invention.

FIG. 11 illustrates cross-section E-E defined in FIG. 10. It shows the copper strips 308 and 408 arranged in contact with the carbon spar caps 306 and 406 along a longitudinal axis of the blade, and it further illustrates lightning receptors, including receptors 304*a*, 304*b*, 304*c*, and suction side receptors (some of which are pointed to by reference 1104), arranged in contact with respective copper strips 308 and 408, without interfering with the carbon spar caps 306 and 406. Due to the geometry selected for this example, conductive elements 321 and 322, contacts 631, 931, 932, and 933 are also intersected and illustrated as such. The person skilled in the art will readily appreciate that the exact positions of the various elements are a matter of design. However, the example illustrates the contact between the conductive elements 321 and 322 on the one hand and contacts 631, 931, 932, and 933 on the other hand, and the contact between the contacts 631, 931, 932, and 933 on the one hand, and the copper strips 308 and 408 on the other hand, allowing lightning current to be conducted to ground in the event of a lightning strike.

The invention is not limited to the embodiments described herein and may be modified or adapted without departing from the scope of the claimed invention.

LIST OF REFERENCE NUMERALS

2 wind turbine
4 tower
6 nacelle
8 hub
10 blades
14 blade tip
15 tip end
16 blade root
18 leading edge
20 trailing edge
30 root region
32 transition region
34 airfoil region
36 pressure side shell part
38 suction side shell part
40 blade shoulder
300 wind turbine blade
302 downconductor
301*a*-304*c* lightning receptors on pressure side
306 carbon spar cop
308 copper strip
310 lightning receptor on pressure side
321, 322 connector element
404*c* lightning receptor on suction side
406 carbon spar cap
408 copper strip
414 premanufactured portion
416 glass fibre material
631 contact element
931-933 contact element
1104 lightning receptors on suction side
L longitudinal length of the blade

The invention claimed is:

1. A wind turbine blade comprising a first blade shell part (36) and a second blade shell part, wherein the first blade shell part comprises:

a first blade component extending along a longitudinal axis of the wind turbine blade and comprising one or more first carbon fibre structures, the first blade component being at least partially embedded in the first blade shell part;

a first elongate metallic element arranged in direct contact with the first blade component, at least part of the first elongate metallic element being positioned between the first blade component and an outer surface of the first blade shell part; and a first lightning receptor arranged in electrical contact with the first elongate metallic element and extending to or near an outer surface of the first blade shell part, wherein the first lightning receptor does not extend through the first blade component, and/or wherein the second blade shell part comprises:

a second blade component extending along the longitudinal axis of the blade and comprising one or more second carbon fibre structures, the second blade component being at least partially embedded in the second blade shell part;

a second elongate metallic element arranged in direct contact with the second blade component, at least part of the second elongate metallic element being positioned between the second blade component and an outer surface of the second blade shell part; and a second lightning receptor arranged in electrical contact with the second elongate metallic element and extending to or near an outer surface of the second blade shell part, wherein the second lightning receptor does not extend through the second blade component.

2. The wind turbine blade of claim 1, wherein the first lightning receptor does not extend into the first blade component, and/or wherein the second lightning receptor does not extend into the second blade component.

3. The wind turbine blade of claim 1, wherein the first elongate metallic element is at least partially embedded in the first blade shell part, and/or wherein the second elongate metallic element is at least partially embedded in the second blade shell part.

4. The wind turbine blade of claim 1, wherein the first elongate metallic element along its entire length is embedded in the first blade shell part, and/or wherein the second elongate metallic element along its entire length is embedded in the second blade shell part.

5. The wind turbine blade of claim 1, wherein the first lightning receptor is arranged between an outer surface of the first blade shell part and the first blade component, and/or wherein the second lightning receptor is arranged between an outer surface of the second blade shell part and the second blade component.

6. The wind turbine blade of claim 1, wherein the first lightning receptor extends at least from the first elongate metallic element to or near an outer surface of the first blade shell part, and/or wherein the second lightning receptor extends at least from the second elongate metallic element to or near an outer surface of the second blade shell part.

7. The wind turbine blade of claim 1, wherein a length of the first elongate metallic element is at least 50% of a length of the wind turbine blade, such as at least 60% of the length of the wind turbine blade, such as at least 75% of the length of the wind turbine blade.

8. The wind turbine blade of claim 1, wherein a ratio between a length of the first elongate metallic element and a length of the first blade component is in the range 0.8 to 1.2, and/or wherein a ratio between a length of the second elongate metallic element and a length of the second blade component is in the range 0.8 to 1.2.

9. The wind turbine blade of claim 1, wherein the first blade component and the first elongate metallic element are in contact with one another substantially along an entire length of the first blade component or an entire length of the first elongate metallic element, whichever is shorter.

10. The wind turbine blade of claim 1, further comprising a first electrical connector electrically connecting the first elongate metallic element and the second elongate metallic element to one another at distal ends of the first elongate metallic element and the second elongate metallic element.

11. The wind turbine blade of claim 1, wherein the first blade component and/or the second blade component is a spar cap comprising carbon fibre material.

12. The wind turbine blade of claim 1, wherein the one or more first carbon fibre structures and/or the one or more second carbon fibre structures comprise carbon fibre mats or carbon fibre reinforced composite planks.

13. The wind turbine blade of claim 1, wherein the first metallic conductor and/or the second metallic conductor is made of copper or a copper alloy.

14. The wind turbine blade of claim 1, wherein the first metallic conductor and/or the second metallic conductor has a cross-sectional area of at least 50 $mm^2$.

15. The wind turbine blade of claim 1, wherein the first elongate metallic element is a metal strip, wherein at least part of the metal strip has a rectangular cross-section along the longitudinal axis of the wind turbine blade, a height of said part of the first elongate metallic element being in the range 1-5 mm, and a width of said part of the first elongate metallic element is in the range 5-30 mm.

16. The wind turbine blade of claim 1, further comprising a downconductor arranged between the first blade shell part and the second blade shell part and extending to a root end of the wind turbine blade, the downconductor being electrically connected to the first elongate metallic element and/or the second elongate metallic element, wherein a length of the downconductor is at most 0.5 times a length of the wind turbine blade.

17. The wind turbine blade of claim 1, further comprising a downconductor arranged between the first blade shell part and the second blade shell part and extending to a root end of the wind turbine blade, the downconductor being electrically connected to the first elongate metallic element and/or the second elongate metallic element, wherein a length of the downconductor is at most 0.5 times a length of the wind turbine blade, and wherein the first lightning receptor is arranged between an outer surface of the first blade shell part and the first blade component, and/or wherein the second lightning receptor is arranged between an outer surface of the second blade shell part and the second blade component.

18. The wind turbine blade of claim 1, further comprising a downconductor arranged between the first blade shell part and the second blade shell part and extending to a root end of the wind turbine blade, the downconductor being electrically connected to the first elongate metallic element and/or the second elongate metallic element, wherein a length of the downconductor is at most 0.5 times a length of the wind turbine blade, and wherein the first lightning receptor extends at least from the first elongate metallic element to or near an outer surface of the first blade shell part, and/or wherein the second lightning receptor extends at least from the second elongate metallic element to or near an outer surface of the second blade shell part.

* * * * *